April 10, 1951 W. G. FITZSIMMONS 2,548,007
WELDING WHEEL
Filed Jan. 25, 1949 2 Sheets-Sheet 1
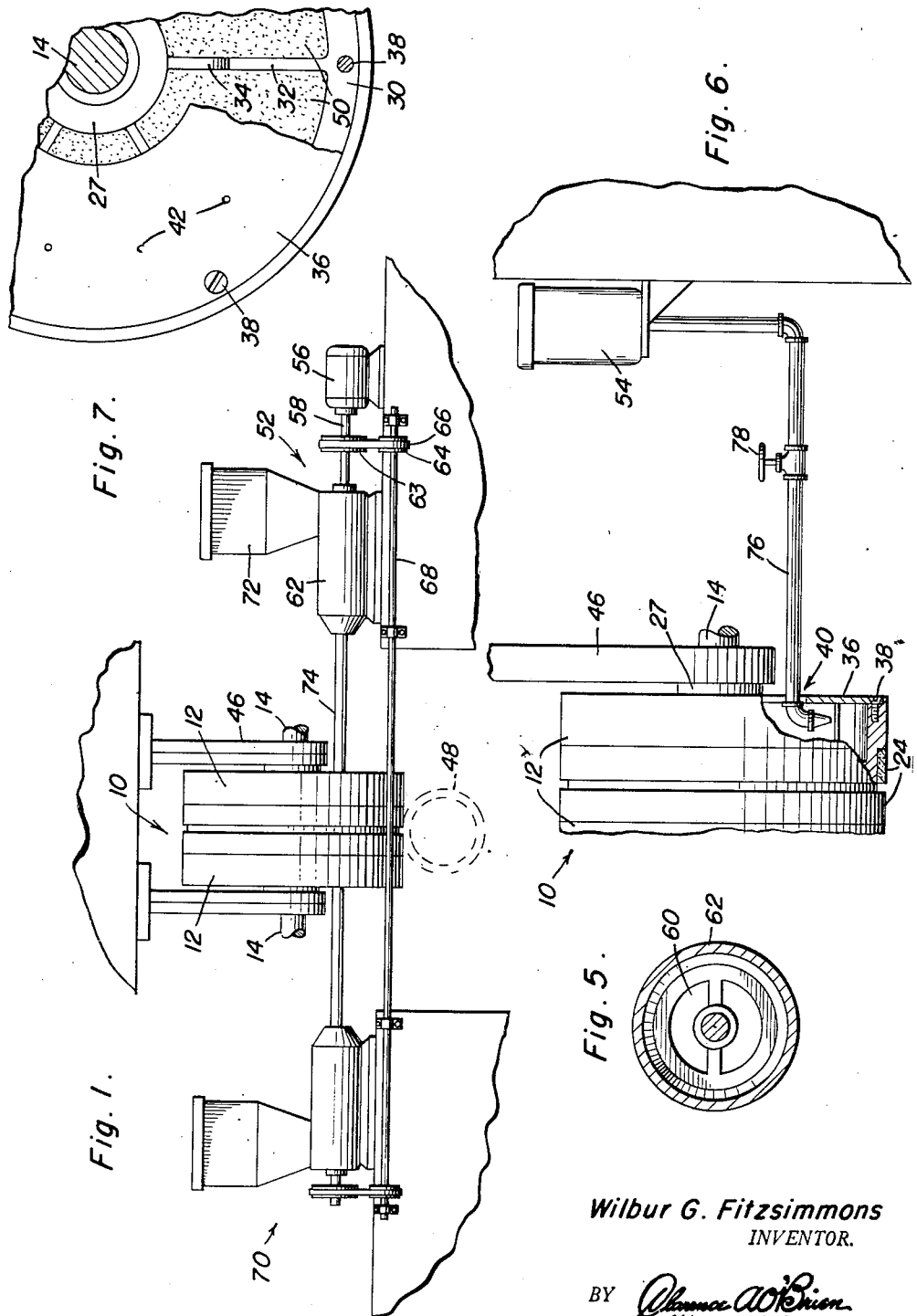
Wilbur G. Fitzsimmons
INVENTOR.

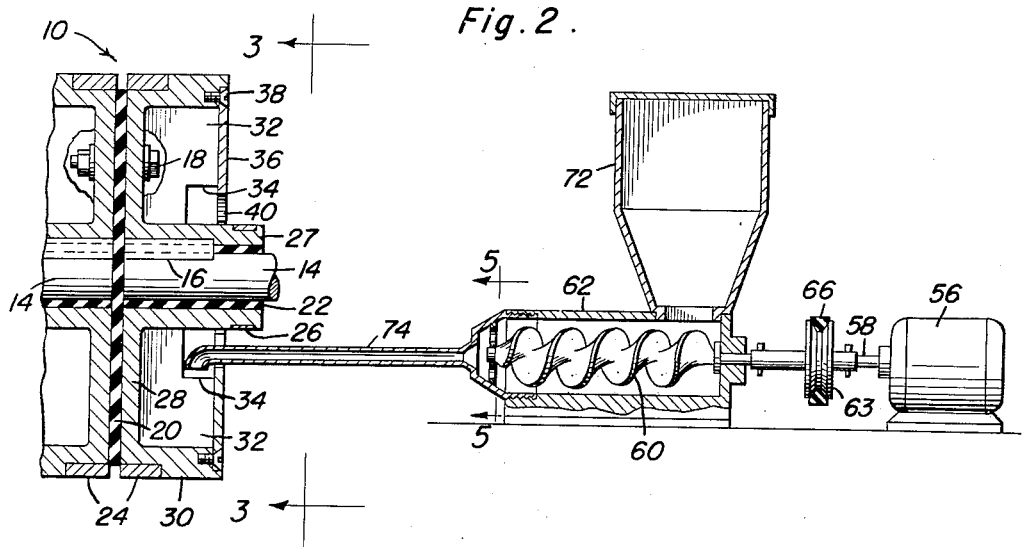
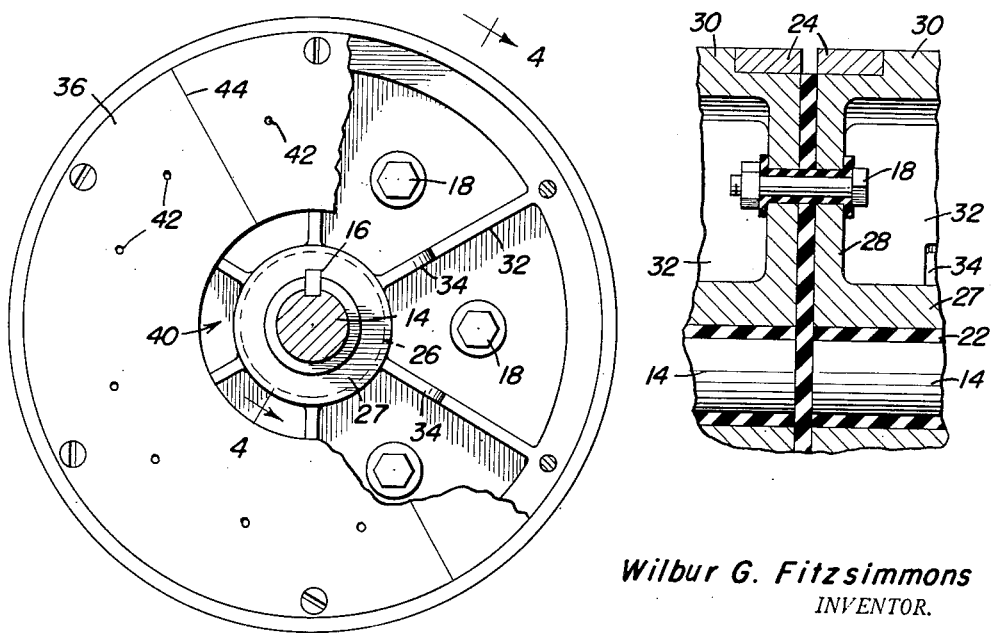

Patented Apr. 10, 1951

2,548,007

UNITED STATES PATENT OFFICE 2,548,007

WELDING WHEEL

Wilbur G. Fitzsimmons, Ocala, Fla.

Application January 25, 1949, Serial No. 72,606

6 Claims. (Cl. 219—4)

This invention relates generally to welding apparatus and more particularly to means for cooling a welding wheel.

A primary object of this invention is to provide for the cooling of welding wheels during the operation thereof, whereby the useful life of the electrodes can be extended considerably without interfering with the efficiency of the apparatus.

Another object of this invention is to provide means for cooling a welding wheel without increasing the danger of the two electrodes shorting during operation.

Still another object of this invention is to provide for the alteration of existing welding wheels to receive coolant.

Another object of this invention is to provide a welding wheel which may be used with solid coolant, either pulverized or in pre-formed cakes, or with liquid coolant, this versatility of the apparatus allowing the use of the invention in many different types of installations.

And a last object to be mentioned specifically is to provide a device of the character mentioned above which is relatively inexpensive and practicable to manufacture, which is safe, simple and convenient to use, and which will give generally efficient and durable service.

With these objects definitely in view, this invention resides in certain novel features of construction, combination and arrangement of elements and portions as will be hereinafter described in detail in the specification, particularly pointed out in the appended claims and illustrated in the accompanying drawings which form a material part of this application, and in which:

Figure 1 is a view of the assembled apparatus, together with fragmentary portions of support members, the actual drive means for the welding wheel being deleted as unnecessary to represent in this application, and the invention being represented as including the means used when pulverized coolant is used;

Figure 2 is a vertical sectional view of a portion of the apparatus illustrated in Figure 1;

Figure 3 is an end view of the arc welding wheel with a segment of the closure plate removed, the view being taken from the line 3—3 in Figure 2;

Figure 4 is a fragmentary vertical sectional view taken on the line 4—4 in Figure 3;

Figure 5 is a vertical sectional view taken on the line 5—5 in Figure 2;

Figure 6 is a fragmentary view showing the principal portions of this invention when a liquid coolant is used; and Figure 7 is a fragmentary view of a welding wheel according to this invention and the figure is designed to indicate how pre-formed cakes of coolant may be used.

Similar characters of reference designate similar or identical elements and portions throughout the specification and throughout the different views of the drawings.

Referring now to the drawings in detail, it should first be noted that the apparatus will ordinarily include two substantially identical parts in the dual wheel construction indicated at 10, and in this specification the two parts will be referred to as the welding wheels 12. The wheels 12 are secured on colinear shafts 14, at least one of the wheels being keyed, as at 16, to one of the shafts 14 and a plurality of bolts 18 are used to secure the two wheels together. As best indicated in Figure 4, these bolts 18 are insulated from the wheels and a disk of insulation, indicated at 20, separates the two wheels and the two shafts 14, all of which may be according to conventional practice. Further insulation 22 will insulate the shafts 14 from the wheels, and conventional annular electrodes 24 will be carried by the wheels, in spaced relation, and current will be supplied to the wheels by brushes, not represented, engaging slip rings 26 on the hub portions 27 of the wheels. Each wheel will include a disk 28 and a rim 30 which will carry the corresponding electrode 24 and which will ordinarily be disposed parallel to the axis of the wheels, and these wheels will also include radiating spokes 32 of plate character.

The plate spokes 32 will be recessed, as at 34, adjacent to the hub 27 and at points remote from the disk portion 28 of the wheels. Each wheel will be suitably adapted to receive a closure plate 36 on the side of the wheel remote from the disk portion 28 thereof, and a plurality of screws 38 may be used to secure the plate removably on the rim portions 30, so that a chamber is defined within each wheel, bounded by the rim, disk portion 28, hub and the plate 36, and the chamber may be thought of as being divided by the plate spokes 32 which constitute partitions in this chamber. The plate is axially apertured so that a space 40 is provided between the plate and the hub 27. Finally, the plate 36 is provided with a plurality of apertures 42 which are preferably spaced a considerable distance from the periphery of the plate, and the plate is divided into two parts as indicated by the line 44 in Figure 3 to facilitate the removal and replacement of the plates when the welding apparatus includes such structure as the hanger support 46 used to carry the bearings of the shafts 14, as will be understood from an inspection of Figures 1 and 6. It will be noted that in Figure 1 there is illustrated a pipe 48 which represents the work operated upon by a machine of this character.

It is proposed by this invention to place coolant in the welding wheels, within the chamber mentioned above. When it is desired that the coolant be applied in the form of pre-formed cakes 50 of carbon dioxide or the like, these cakes will be manually inserted within the said chamber and between the plate spokes 32, as clearly indicated in Figure 7, the divided plates 36 being removed to allow such placement of the solid cakes of coolant within the wheels. When pulverized coolant, such as plulverized solid carbon dioxide, is to be used, apparatus such as that indicated at 52 in Figure 1 will be used, and when liquid coolant is to be used a tank 54, as indicated in Figure 6, will be supplied. It will be noted that the wheel construction need not be altered in order to accommodate the invention for use with either pre-formed cakes of solid coolant, pulverized coolant, or a liquid coolant. When a pulverized coolant is to be used, an electric motor 56 may be used to drive a shaft 58 directly connected to a feed screw 60 within a feed screw casing 62, the motor and casing being mounted on suitable structure at one side of the welding wheels. A pair of coacting pulleys 63 and 64, a belt 66, and a jack shaft 68 may be used to transmit power from the electric motor 56 to a unit 70 on the opposite side of the arc welding wheels, this unit 70 being practically identical to the installation generally indicated by the numeral 52. A hopper 72 will be provided on the feed screw casing 62 and a supply pipe 74 will be rigidly secured to the one end of the casing 62 and will extend through the space 40 between the hub 27 and the plate 36, so that the outlet of the supply pipe 74 will be within the wheel 12, and the reason for the recessing of the plate spokes 32, as at 34, will now be understood. Finally, when liquid coolant is used, as indicated in Figure 6, a somewhat similar supply pipe 76, having a valve 78, will be used to lead liquid coolant from the tank 54, through the said space 40, into the wheel.

The operation of this invention will be clearly understood from a consideration of the foregoing description of the mechanical details thereof, taken in connection with the drawings and with the above recited objects of this invention. In recapitulation, it need only be added that in each case the coolant, upon evaporation, will escape through the apertures 42 and the space 40 and there is no likelihood of the escaping gas causing a short circuit between the electrodes 24. Since the wheels will ordinarily be constructed of highly conductive material, the cooling effect will be transmitted directly to the electrodes 24 and the above recited objects will be amply obtained.

Minor variations from the embodiment of this invention illustrated may be resorted to without departure from the spirit of this invention, and the scope thereof should be determined only as limited by a proper interpretation of the terms used in the subjoined claims.

Having described the invention, what is claimed as new is:

1. A welding wheel having a plurality of radially disposed chambers to receive cakes of coolant material, and a closure for said chambers to retain said cakes therein, said chambers having at least one gas vent.

2. A cooled welding wheel comprising a hub, a disk, an outer rim, said hub and rim being integral with and extending from the same side of said disk, and a closure plate secured to the wheel and extending substantially parallel to and spaced from said disk, a chamber being defined between said hub, disk, rim, and plate to receive coolant in solid form, said plate being easily removable from the wheel without disturbing the mounting of the wheel and to allow insertion of the coolant.

3. A wheel according to claim 2 and wherein said plate is divided and removably secured on said wheel.

4. A cooled welding wheel comprising a hub, a disk, an outer rim, said hub and rim being integral with and extending from the same side of said disk, and a closure plate secured to the wheel and extending substantially parallel to and spaced from said disk, a chamber being defined between said hub, disk, rim, and plate to receive coolant, radiating spokes secured to and between said rim and hub comprising partitions dividing said chamber, said plate being easily removable from the wheel without disturbing the mounting of the wheel to allow insertion of the coolant.

5. A cooled welding wheel comprising a hub, a disk, an outer rim, said hub and rim extending from the same side of said disk, and a closure plate secured to the wheel and extending substantially parallel to and spaced from said disk to define a chamber between said hub, disk, rim, and plate to receive coolant, radiating spokes secured to and between said rim and hub comprising partitions dividing said chamber, said plate being apertured and spaced from said hub, and said spokes each having a recess adjacent the hub and plate to receive one end of a fixed supply pipe for coolant.

6. A cooled welding wheel comprising a hub, a disk, an outer rim, said hub and rim extending from the same side of said disk, and a closure plate secured to the wheel and extending substantially parallel to and spaced from said disk to define a chamber between said hub, disk, rim, and plate to receive coolant, radiating spokes secured to and between said rim and hub comprising partitions dividing said chamber, said plate having an annular axial recess greater in diameter than said hub, said spokes each having a recess adjacent the hub and plate, a fixed supply pipe for coolant having an outlet end portion extending between the hub and plate and into said recesses as the wheel is turned, and a supply of coolant operatively connected with said pipe.

WILBUR G. FITZSIMMONS.

REFERENCES CITED

The following references are of record in the file of this patent:

UNITED STATES PATENTS

| Number | Name | Date |
| --- | --- | --- |
| 1,553,727 | Sjobring et al. | Sept. 15, 1925 |
| 1,580,401 | Borgadt | Apr. 13, 1926 |
| 1,877,616 | Strelitz | Sept. 13, 1932 |
| 2,015,415 | Steiner | Sept. 24, 1935 |
| 2,059,236 | Holslag | Nov. 3, 1936 |
| 2,038,668 | Newson | Apr. 28, 1936 |
| 2,136,059 | Sciaky | Nov. 8, 1938 |
| 2,254,657 | Kennon | Sept. 2, 1941 |
| 2,281,335 | Somes | Apr. 28, 1942 |
| 2,330,503 | Longoria | Sept. 28, 1943 |
| 2,407,676 | Munson | Sept. 17, 1946 |
| 2,416,374 | Brunberg | Feb. 25, 1947 |

FOREIGN PATENTS

| Number | Country | Date |
| --- | --- | --- |
| 591,033 | Great Britain | Aug. 5, 1947 |